Figure 2A:
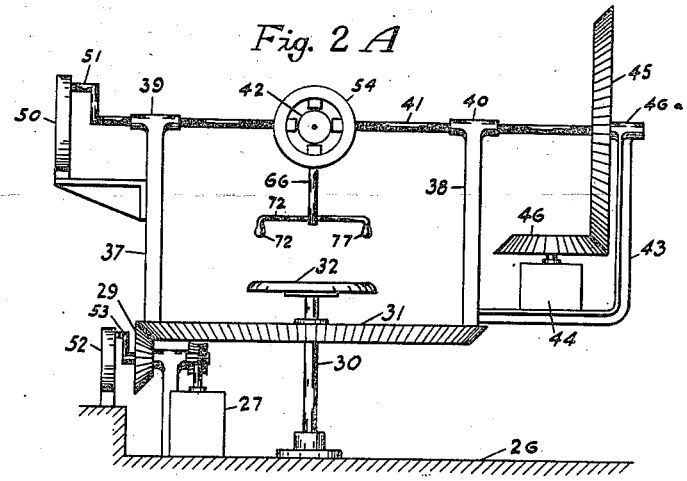

Aug. 13, 1946.  E. C. WAHLBERG  2,405,678
REMOTE CONTROL SYSTEM
Filed Aug. 6, 1943  3 Sheets-Sheet 1
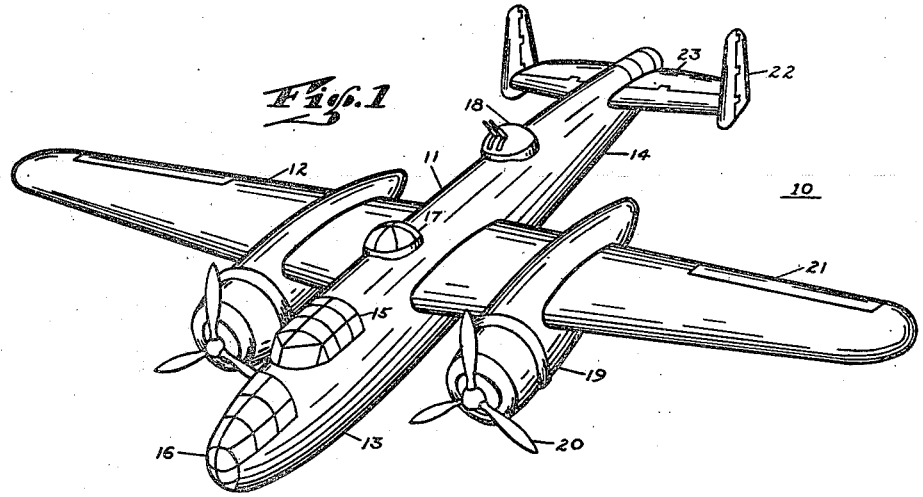
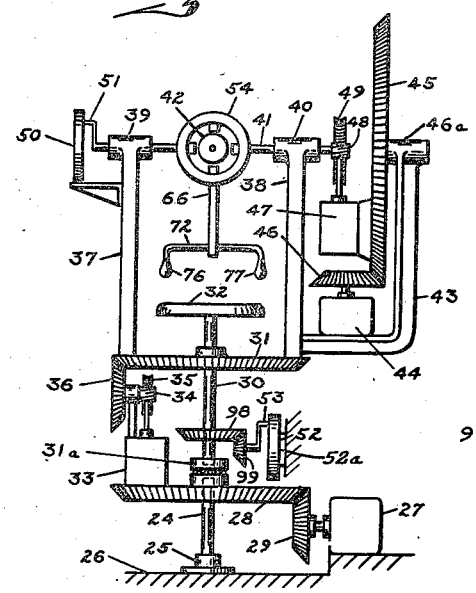
INVENTOR
Eric Clifton Wahlberg
BY
Murray Robinson
ATTORNEY Aug. 13, 1946.  E. C. WAHLBERG  2,405,678
REMOTE CONTROL SYSTEM
Filed Aug. 6, 1943  3 Sheets-Sheet 2

INVENTOR
Eric Clifton Wahlberg
BY Thomas C. Britts
His ATTORNEY

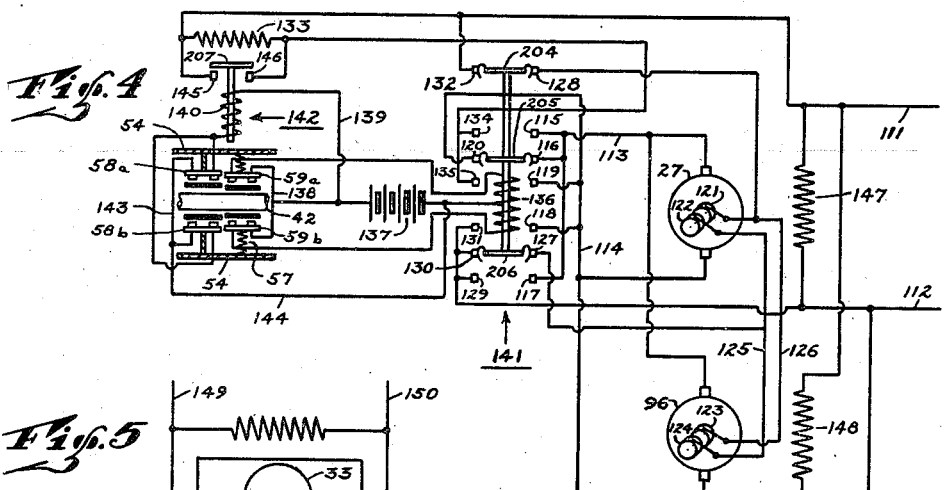
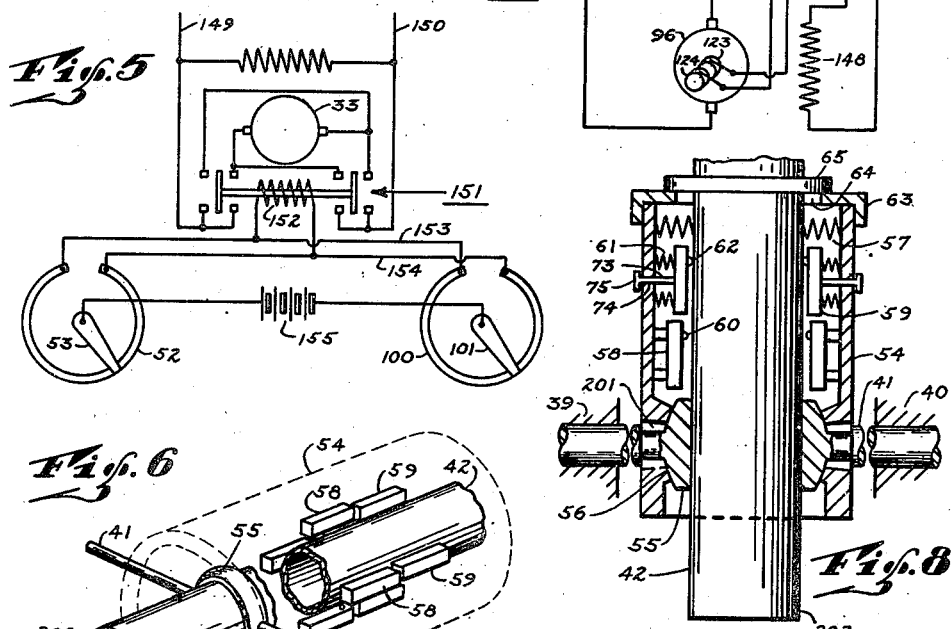
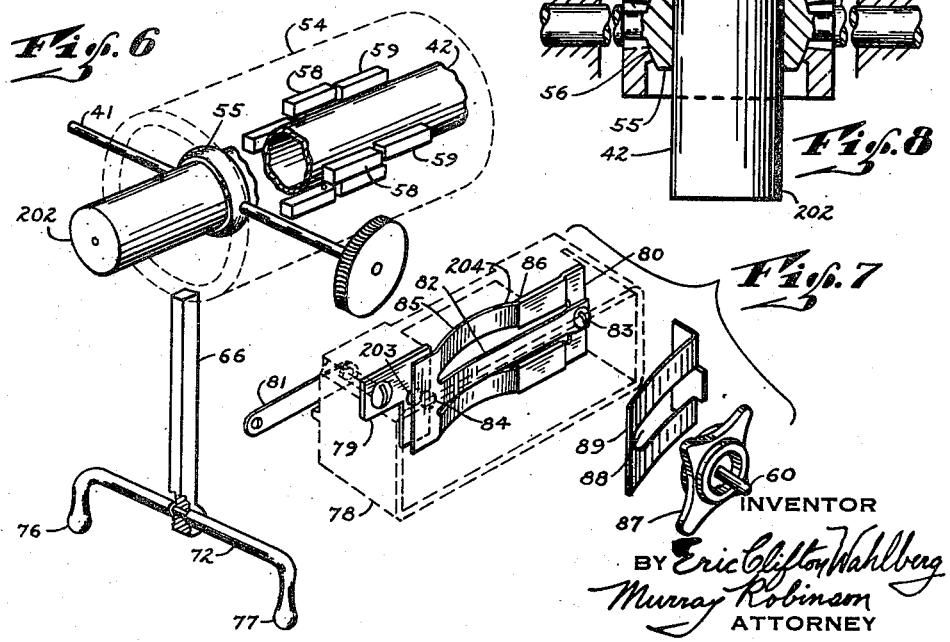

Patented Aug. 13, 1946

2,405,678

UNITED STATES PATENT OFFICE 2,405,678

REMOTE CONTROL SYSTEM

Eric Clifton Wahlberg, Stamford, Conn., assignor to Electrolux Corporation, Old Greenwich, Conn., a corporation of Delaware Application August 6, 1943, Serial No. 497,600

5 Claims. (Cl. 172—239)

This invention relates to a system of remote control and more particularly to such a system for use in aircraft, especially military aircraft.

The design of modern military aircraft has produced a number of new problems because of the fact that such aircraft are required to fly at very high altitudes. When flying at high altitudes, it is necessary that the occupants of the plane be supplied with oxygen in addition to that present in the rarified atmosphere. If this is done by the use of an oxygen mask, it is found that the occupants of the plane are somewhat handicapped by the necessity of having to wear the mask and furthermore their bodily efficiency is reduced because of the high percentage of oxygen in the mixture which they breathe and because of the low pressure around their bodies. It has been proposed to solve this problem by providing the occupants with space suits but although such suits overcome some of the above mentioned problems, they are even more cumbersome than the oxygen masks. The only really satisfactory solution is to seal the cabin occupied by the aircraft personnel and supercharge it so as to maintain within the cabin normal atmospheric conditions.

If a sealed cabin is used, there is a difficult problem presented in connection with the operation of the gun turret. A revolving turret with apertures through which moving guns project is a rather difficult construction to seal effectively. The gun, however, must have an operator and the operator must be supplied with oxygen, the same as the rest of the occupants of the plane. As a solution of this problem, applicant proposes to locate the gun turret in a part of the aircraft separate from the sealed cabin and operate the turret by remote control. Electrical remote control rather than mechanical is desirable because there need be no packed sliding joints where the electrical control wires pass through the wall of the sealed cabin. With such an arrangement a gun director may have an observation window forming one wall of the sealed cabin and may operate the gun turret by remote control.

Electric remote control of guns is well known in the art. Such control systems may be classified in two groups called respectively space control and speed control systems. By space control it is meant that the gunner controls the position of the remote guns merely by pointing his sighting device at the target. As the sighting device is moved to follow the target, the guns move in a like direction. By speed control is meant the control of the position of the remote guns in azimuth and altitude by movement of azimuth and altitude control levers at the gun director station in which the speed of movement of the gun in either azimuth or altitude is dependent upon the degree of displacement of the corresponding control levers. In a speed control system there must, of course, be an additional follow-up system for repeating the position of the gun at the gun director station. With a space control system the position of the sight itself serves as an indication of the position of the gun.

In most of the prior art remote control systems of either of the above mentioned types there has been a considerable lag in the system so that as long as the gun was in motion the indicated position thereof at the gun director station was slightly in error. In the case of known space controls the sight must first be moved through a certain angle before the gun starts to follow the motion, and in known speed controls the gun must move through a certain angle before the repeater at the gun director station begins to move. Such error can be reduced to a sufficiently small value so that such remote control systems are satisfactory for naval fire control systems and land batteries when the target is relatively fixed. However, for antiaircraft guns and for armament on fighting planes themselves any time lag or mechanical lag whatsoever reduces the efficiency of the firing system very markedly. This is due to the extremely high speeds and close ranges involved. For such applications it is imperative that the lag approximate zero as closely as possible.

It is the principal object of applicant's invention to provide a remote control system embodying both space control and speed control in which the lag has been reduced to a minimum. This is accomplished in part by the use of a novel control system in which the gun turret and sighting device are driven by synchronous motors operated in parallel from the same source of power so that there is no lag introduced in the system. It is necessary that these motors operate in exact synchronism throughout repeated starting and stopping operations and further that the motors stop quickly when deenergized. This is accomplished by an adaptation of applicant's system of synchronized motors disclosed in greater detail in his copending United States Patent applications Serial No. 428,018, filed January 24, 1942, and Serial No. 472,464 filed January 15, 1943.

Another main object of applicant's invention is to provide an improved space control system. According to this invention the space control not only operates to drive the sight at the gun director station but also drives a seat or platform upon which the gun director is seated thereby facilitating his operation of the space control.

Further to the accomplishment of both of the above stated objects it is another object of this invention to provide a space control in which initiation of motion is accomplished without moving the sighting device itself. To accomplish this, applicant moves a member that is concentric with the sight. This system eliminates the lag between the position of the sight and the gun that is inherent in space controls dependent on displacement of the sight for initiation of motion. It also makes possible a more sensitive control.

While this invention will be described in its application to remote control of guns in military aircraft, it should be understood that it also has numerous non-military uses. As one example of such use might be mentioned the control of a steam shovel, crane, or other lifting device by an operator located in a control cabin some distance away from the shovel itself. The cabin might either be mounted on the body of the machine together with the driving apparatus or it might be located entirely separate from the apparatus in a stationary or moving control station. Since the claimed features of the invention are fully disclosed by the description of its application in a military fire control system, it has been thought unnecessary to describe it in other applications. Further objects and advantages of the invention will appear from the description set forth below.

Figure 3A:
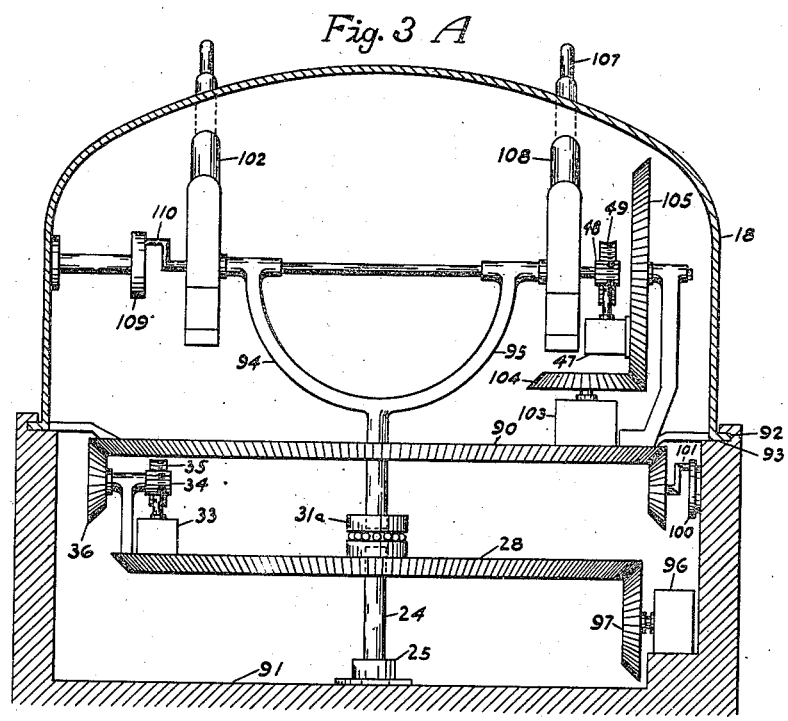

Referring to the drawings, Fig. 1 is a perspective view of a military airplane embodying my invention. Figs. 2 and 3 are elevations, largely schematic, of the gun director and gun turret respectively. Figs. 2A and 3A are views similar to Figs. 2 and 3 showing the correction motors associated with the gun turret. Figs. 4 and 5 are wiring diagrams showing the electric circuits used in the invention. Fig. 6 is a perspective view and Fig. 8 a section showing certain details of the combined speed and space control apparatus according to my invention and Fig. 7 is an exploded view of a switch suitable for use in connection therewith.

Referring to Fig. 1, there is shown an airplane designated generally by the reference character 10. The airplane comprises a fuselage 11 having wings 12. The fuselage comprises a forward sealed cabin 13 and an after part 14. The cabin 13 is provided with observation windows 15, 16, and 17 for the pilot, bombardier, and gun director respectively. A revolving gun turret 18 is shown in the after part 14 of the fuselage. If desired, additional turrets similar to 18 could be provided beneath the fuselage and also on the wing surfaces. Motors 19 having propellers 20 are mounted in the wings. The airplane is provided with ailerons 21, rudders 22, and elevators 23. According to this invention the ailerons, rudders, and elevators should be operated by electric remote control means of any known type from within the sealed cabin 13. Likewise, the propeller pitch changing mechanism and the engine throttles should be operated by similar remote control means from within the sealed cabin. Remote control means for operating the gun turret 18 from within the cabin is the principal subject of this invention and will be described with reference to the remaining figures of the drawings.

Referring to Fig. 2, there is shown the gun directing apparatus that is mounted immediately below the observation window 17. A shaft 24 is mounted in end bearing 25 supported on the frame 26 of the fuselage. An electric motor 27 also mounted on the frame 26 drives a gear 28 through bevel gear 29. Gear 28 is supported on the shaft 24. In axial alignment with shaft 24 there is a second shaft 30 supported on gear 28 by a bearing 31a. Shaft 30 has attached thereto a gear 31 and on the upper end of the shaft there is affixed a seat 32. An electric motor 33 is mounted on the gear 28 and drives gear 31 through worm 34, worm wheel 35, and bevel gear 36.

The gear 31 carries standards 37 and 38 at the upper ends of which are bearings 39 and 40. Shaft 41 carrying a telescope or other sighting device 42 is rotatably mounted in the bearings 39 and 40. Standard 38 supports an L shaped standard 43 having a bearing 46a at its upper end. Standard 43 also carries an electric motor 44 which drives a gear 45 through a bevel gear 46. Supported on the gear 45 is an electric motor 47 which drives the shaft 41 through worm 48 and worm wheel 49. At the other end of the shaft 41 from the worm wheel 49 there is supported on a standard 37 a potentiometer 50, the moving contact 51 of which is mounted on the end of the shaft 41. A similar potentiometer 52 is carried on a stationary part 52a of the fuselage. Its moving contact 53 is driven by the shaft 30 through bevel gears 98 and 99.

It will be apparent that as long as electric motor 33 is at rest the electric motor 27 will drive shaft 30 at the same speed it drives shaft 24. Likewise, as long as motor 47 is at rest, the motor 44 will drive shaft 41 at the same speed it drives gear 45. The motors 27 and 44 thus serve to drive the telescopic sight 42 in azimuth and altitude respectively. The motors 33 and 47 are provided merely to introduce any necessary corrective displacement between shafts 24 and 30 and between gear 45 and shaft 41. The purpose and operation of the corrector motors 33 and 44 will be described later.

Referring to Fig. 3, there is shown the gun turret 18 which is mounted on gear 90. Gear 90 is rotatably supported on the frame 91 of the fuselage by means of an annular flange 92 cooperating with an annular groove 93 formed in the frame 91 near the outer surface of the fuselage. An electric motor 96 supported on the frame 91 drives the gear 90 through a bevel gear 97. Supported on the gear 90 are standards 94 and 95 carrying a shaft 106 in bearings at the upper end thereof. An electric motor 103 is supported on the gear 90 and drives shaft 106 through bevel gears 104 and 105. Guns 102 are mounted at either end of the shaft 106. The ends 107 of the guns project through slots 108 in the armored turret 18. The slots 108 are long enough to permit the guns 102 to move as much as needed in the vertical plane. If desired, these slots 108 may be continuous from one side of the turret to the other, providing for movement of the guns through an arc of 180° or more. A potentiometer 109 is supported inside the turret 18. Its moving contact 110 is carried by the end of the shaft 106. A similar potentiometer 100 is mounted on the frame 91. The moving contact 101 is driven by the electric motor 96. It will be seen that the apparatus just described provides for movement of the guns 102 in both azimuth and altitude. The guns are driven in azimuth by motor 96 and in altitude by motor 103.

The gear ratios of the apparatus shown in Figs. 2 and 3 should be such that when motors 27 and 96 are driven in synchronism, the sight 42 and the guns 102 will be moved in azimuth through the same angle and at the same speed. Likewise, the gear ratios should be such that motors 44 and 103, when operated synchronously, will drive the sight 42 and the guns 102 synchronously in altitude. Should the main motors get out of synchronism, corrector motors 33 and 47 are automatically operated to restore synchronism between the sight 42 and the guns 102. These corrector motors are controlled by balanced bridge circuits comprising the potentiometers 50, 109, 52, and 100. The gear ratios of the apparatus should be such that moving contact 51 and moving contact 110 operate synchronously as long as the sight 42 and guns 102 move synchronously in altitude. Likewise, the gear ratios should be such that moving contact 53 and moving contact 101 operate at the same speed as long as the sight 42 and guns 102 move synchronously in azimuth. Should the main drive motors get out of synchronism, the sight and guns would also get out of synchronism and likewise the positions of the moving contacts of the potentiometers. This would upset the balance of the bridge circuits and operate the corrector motors to drive the sight back into synchronism with the guns. The details of an electric circuit for carrying out this operation will be described later.

It is obvious that collector motors 33 and 47 may be incorporated in the apparatus for driving the gun turret instead of that for driving the sight. Figs. 2A and 3A illustrate the arrangement of the sight and turret, respectively, when the correction motors are so arranged, in which case the correction motors drive the guns back into synchronism with the sight, thus making it unnecessary to re-sight the latter after a correction has taken place.

Referring again to Fig. 2, there is shown a control cylinder 54 mounted concentrically with the telescope 42. This control cylinder may be rocked slightly with respect to the telescope by movement of the handles 76 and 77 on the ends of the handle bar 72. The details of construction of this combined speed and space control are shown in Figs. 6 and 8. As shown in Figs. 6 and 8, the sight 42 is carried by shaft 41 in a supporting ring 55. The supporting ring 55 is formed exteriorly with a spherical surface cooperating with spherical surface 56 on the interior of cylinder 54 to form a ball and socket support for the cylinder 54. The cylinder 54 is cut away as at 201 to permit rocking thereof with respect to the sight 42 without being hampered by the shaft 41. Affixed to the interior of the cylinder 54 are four stationary switches 58 mounted above and below and at either side of the sight 42. These switches are of the snap action type and are operated by push buttons 60. Four more snap action switches 59 are mounted within the cylinder 54 and similarly disposed with respect to the sight 42. The switches 59 are supported within the cylinder 54 by means of springs 61. There are studs 73 carried by the switches 59. These studs project through apertures 74 in the cylinder 54. Buttons 75 on the ends of studs 73 limit inward motion of the switches 59. When the sight 42 is centered within cylinder 54, the push buttons 62 of the switches 59 just make contact with the exterior of the sight 42. The springs 61 are sufficiently strong to support the switches against movement when the cylinder 54 is rocked with respect to sight 42 so as to permit actuation of the switches by push buttons 62. After a push button 62 has been actuated, the corresponding springs 61 will be compressed, permitting actuation of the push button 60 of the adjoining switch 58 upon further displacement of cylinder 54 in the same direction. Springs 57 are provided for biasing the cylinder 54 into a position of axial alignment with sight 42. The end of the cylinder 54 is closed by means of a cap 63 having an opening 64 centrally thereof of sufficient diameter to permit rocking of cylinder 54 with respect to sight 42. A collar 65 formed on sight 42 provides a sliding seal for the opening 64. Either the collar is resilient or there is enough play provided to permit relative motion at this point.

In Fig. 6, there is shown the construction of the operating levers connected to the cylinder 54 for rocking it with respect to sight 42. Control lever 66 is rigidly affixed at one end to the cylinder 54 and is pivotally connected at its opposite end to handle bar 72. It will be apparent that if an operator seated on seat 32 (Fig. 3) moves both the handles 76 and 77 on the ends of the handle bar 72 in the same direction either towards or away from himself, a motion will be imparted to the cylinder 54 rocking it with respect to sight 42 in a plane perpendicular to the shaft 41. On the other hand, if the operator moves one of the handles towards himself and the other handle away from himself, the cylinder 54 will be rocked with respect to sight 42 in the plane containing the sight 42 and the shaft 41. In this arrangement the end 202 of the sight 42 is located close to the axis of the shaft 41 so that change in the altitude of the sight 42 will not produce any great change in the position of the eye piece thereof. This is desirable so that the gun director will not have to move his head appreciably in following a target. The handles 76 and 77, however, are located a considerable distance below the shaft 41 in order to be near the operator's hands. This provides a certain leverage between the handle bars 76 and 77 and the cylinder 54 whereby a slight pressure on the handle bars will produce sufficient motion of the cylinder 54 to actuate one of the switches 58 and a slight additional pressure without appreciable movement will operate one of the switches 59. Switches 59 operate to drive the sight and gun at one speed and switches 58 operate to drive them at a higher speed.

Referring to Fig. 7, there is shown the internal construction of a snap action switch suitable for use in this invention. The switch comprises a casing 78 supporting conducting plates 79 and 80. A connection strap 81 is electrically connected to plate 79 and a similar strap (not shown) is connected to plate 80. Plate 80 carries a contact arm 82 which is bolted thereto at 83. Contact arm 82 carries a silver contact 84 which cooperates with a similar silver contact 203 on plate 79 to open and close the circuit. Two leaf springs 85 are formed on the end of the contact arm 82 and their free ends 204 are supported in grooves 86 in the end of plate 80. These springs are always slightly in compression, and together with contact arm 82, form a compression toggle. A very slight movement of contact arm 82 will cause the toggle to pass over center and snap into closed circuit position. When the contact arm 82 is allowed to move back to its original position, the toggle will again pass over center and snap to open position. The contact arm 82 is moved by push button 60 through insulation block 87. A shim 89 having an opening 88 is supported on the plate 80 and biases the button 60 outwardly. This shim also serves to limit inward motion of button 60 by rolling out flat on the surface of plate 80. Such a switch is quite useful in the present invention because of its characteristic of operating with a snap action from open to closed position upon very slight displacement of its push button.

In Fig. 4, there is shown a circuit diagram of the connections between the switches 58 and 59 and the main drive motors. The switches 58 and 59 mounted in one plane at either side of the sight 42 control the operation of the motors 27 and 96 for driving the sight and guns in azimuth. The switches 58 and 59 mounted in a perpendicular plane above and below the sight 42 control motors 44 and 103 for operating the sight and guns in altitude. Since the connections between the switches in one plane and their corresponding drive motors are identical with the connections between the switches in the other plane and their corresponding drive motors, only the connections between the azimuth drive motors and switches have been illustrated.

Referring again to Fig. 4, there is shown the sight 42 and the switches 58a and 59a on one side thereof and the switches 58b and 59b on the other side thereof. The switches 59 are supported within the cylinder 54 on springs 61 and the switches 58 are fixedly supported within the cylinder 54. In this figure the switches are shown diagrammatically. Also shown diagrammatically are drive motors 27 and 96 and two relays designated generally by reference characters 141 and 142. The system is energized from a source of direct current connected to wires 111 and 112. The motors 27 and 96 are connected in parallel across line 113 and 114. Line 113 is connected to contacts 115, 116, and 117 of relay 141. Line 114 is connected to contacts 118, 119, and 120 of the same relay. Motors 27 and 96 are constructed as single phase rotary converters and taps are taken from fixed points on their armatures to slip rings 121, 122, and 123, 124 respectively. These slip rings are connected together by wires 125 and 126. Wires 125 and 126 are also suitably connected to contacts 127 and 128 of relay 141. Power line 112 is connected to contacts 129, 130 and 131 and power line 111 is connected to contact 132 of relay 141. Also connected to power line 111 is a series armature resistor 133, the other end of which is connected to contacts 134 and 135 of relay 141.

Relay 141 carries three moving contacts 204, 205, and 206 and is operated by a solenoid 136. The center of solenoid 136 is connected to a suitable source of direct current such as battery 137, the opposite side of which is connected by wire 138 to one contact of each of the switches 59a and 59b. The remaining contacts of these switches are connected to the opposite ends of the solenoid 136.

Battery 137 is also connected by wire 139 to the actuating coil 140 of relay 142. The opposite end of coil 140 is connected to one contact of each of the switches 58a and 58b. The remaining contacts of these switches are connected by wires 143 and 144 to the opposite pole of battery 137. The relay 142 has moving contacts 207 which are normally in open circuit position. When relay 142 is energized, it connects contacts 145 and 146 thereby closing a short circuit around armature resister 133.

Field windings 147 and 148 of the motors 27 and 96 are connected in parallel across power lines 111 and 112.

The system operates as follows:

When the operator, by pressure on the handle bars 76 and 77, rocks the cylinder 54 with respect to sight 42 in a direction having a component in the plane of the switches 58 and 59 controlling the azimuth drive motors 27 and 96, one of the switches 59, say 59a will be closed. This will energize solenoid 136 and cause the moving contacts of relay 141 to move from their rest position to a position one step higher. This will connect motors 27 and 96 in parallel across lines 111 and 112 through armature resister 133. These motors will drive the sight and guns in azimuth until pressure on the handle bars 76 and 77 is released. If the operator wishes to move the gun and sight more rapidly, he may increase the pressure on the handle bars thereby further rocking cylinder 54 to close switch 58a. This will energize coil 140 of relay 142 and its contactor 207 will move to close a circuit between fixed contacts 145 and 146 thereby short circuiting armature resister 133 to speed up the motors. If the pressure on the handle bars is reduced, the switch 58a will again open and the short circuit around resister 133 will also be opened. This will cause the motors to slow down. If the pressure on the handle bars is completely removed, the cylinder 54 will return to its position concentric with sight 42 and the switch 59a will be opened. This will permit the relay 141 to return to the normal position shown in Fig. 4. In this position of the relay, direct current from power lines 111, 112 is supplied to the tie lines 125 and 126 through contacts 132, 138 and 130, 127. At the same time contact 205 closes a short circuit across the armatures of the motors through contacts 120, 116. As described in applicant's aforementioned copending applications this brings the motors quickly to rest by dynamic braking while maintaining them in synchronism.

The operation of the system on movement of the cylinder 54 to close switches 58b and 59b is similar to that described for movement closing switches 58a and 59a and need not be described in detail. The same is true of operation of the system upon movement of cylinder 54 to close the altitude control switches. It will also be apparent that upon movement of the cylinder 54 in a direction having components in both the azimuth and altitude planes the corresponding switches will be closed to actuate the azimuth and altitude drive motors simultaneously. It might be that the pressure on the handle bars 76 and 77 was such as to operate one set of motors at high speed while the other was operating at low speed.

Reference should now be made to Fig. 5 for a description of the operation of the corrector system. In Fig. 5, there is shown the circuit for operating azimuth corrector motor 33 upon relative displacement of the contacts 53 and 101 of the potentiometers 52 and 100. The operation of the altitude corrector motor 44 is identical and hence the circuit diagram therefore has not been shown. The ends of the potentiometers 52 and 100 are connected by leads 153 and 154 to form a Wheatstone bridge circuit. The bridge is energized by a suitable source of electric power, such as battery 155. The opposite poles of the battery are connected to the moving contacts 53 and 101. As long as the sight and the guns are in synchronism, the moving contacts 53 and 101 will be in a position to cause balanced currents to flow through the parallel arms of the bridge circuit from the battery 155. Hence, no current flows through the coil 152 of the relay 151, the coil being connected across equi-potential points in the parallel arms of the bridge circuit. Should the sight and the guns get out of step, however, such as might occur through a failure of the ties between the main driving motors 27 and 96, the moving contacts 53 and 101 will be angularly displaced from each other thereby unbalancing the bridge and actuating the relay 151. The relay 151 constitutes a reversing switch for connecting corrector motor 33 across power lines 149 and 150. The relay will connect the motor 33 in a proper manner for actuating it to bring the sight back into synchronism with the guns. If desired, the power lines 149 and 150 may be connected to the same source of power as the power lines 111 and 112. The batteries 132 and 155 might also be replaced by suitable connections to this same power supply.

From the foregoing description it will be apparent that I have provided a novel remote control system and while certain features thereof are peculiarly adapted for use in the operation of a fire control system for military aircraft, there are many features which are of general application. Furthermore, it is apparent that many modifications may be made in the preferred embodiment of the invention disclosed herein and it is intended to protect by these Letters Patent all forms of invention falling within the scope of the appended claims. Certain subject matter disclosed but not claimed herein, is claimed in my copending divisional application Serial No. 652,322 filed March 6, 1946.

What I claim is:

1. In combination, a member, a body, a controlling device mounted for movement relative to said member and having a zero position relative to said member, electric motor means in driving relationship with said member, electric motor means in driving relationship with said body, each of said electric motor means including an armature winding and a field winding, conductor means providing a path for the flow of current between fixed taps taken from said armature windings, means controlled by said device for connecting said armatures to means supplying electric power to drive said member and said body with motions such that their positions always bear a predetermined relationship to one another, said device also controlling means for bringing said member and said body quickly to rest while maintaining the predetermined relationship, both of said motors being operated in response to the displacement of said device from its zero position relative to said member.

2. In combination, a member, a body, a controlling device mounted for movement relative to said member and having a zero position relative to said member, electric motor means in driving relationship with said member, electric motor means in driving relationship with said body, each of said electric motor means including an armature winding and a field winding, conductor means providing a path for the flow of current between fixed taps taken from said armature windings, means controlled by said device for connecting said armatures to means supplying electric power to drive said member and said body with motions such that their positions always bear a predetermined relationship to one another, said device also controlling means for bringing said member and said body quickly to rest while maintaining the predetermined relationship, both of said motors being operated in response to the displacement of said device from its zero position relative to said member, the direction of motion imparted to said member and body by said motors being the same as the direction of the displacement of said device relative to said member.

3. In combination, a member, a body, a controlling device mounted for movement relative to said member and having a zero position relative to said member, electric motor means in driving relationship with said member, electric motor means in driving relationship with said body, each of said electric motor means including an armature winding and a field winding, conductor means providing a path for the flow of current between fixed taps taken from said armature windings, means controlled by said device for connecting said armatures to means supplying electric power to drive said member and said body with motions such that their positions always bear a predetermined relationship to one another, said device also controlling means for bringing said member and said body quickly to rest while maintaining the predetermined relationship, both of said motors being operated in response to the displacement of said device from its zero position relative to said member, the speed of operation of said motors being dependent upon the amplitude of the displacement of said device relative to said member.

4. In combination, a member, a body, a controlling device mounted for movement relative to said member and having a zero position relative to said member, electric motor means in driving relationship with said member, electric motor means in driving relationship with said body, each of said electric motor means including an armature winding and a field winding, conductor means providing a path for the flow of current between fixed taps taken from said armature windings, means controlled by said device for connecting said armatures to means supplying electric power to drive said member and said body with motions such that their positions always bear a predetermined relationship to one another, said device also controlling means for bringing said member and said body quickly to rest while maintaining the predetermined relationship, both of said motors being operated in response to the displacement of said device from its zero position relative to said member, the speed and direction of motion imparted to said member and body by said motors being responsive to the amplitude and direction of the displacement respectively of said device from its zero position relative to said member.

5. In combination, a member, a body, a controlling device, electric motor means in driving relationship with said member, electric motor means in driving relationship with said body, each of said electric motor means including an armature winding and a field winding, conductor means providing a path for the flow of current between fixed taps taken from said armature windings, means controlled by said device for completing a circuit from said armature and field windings to means for supplying operating electric power to drive said member and said body with motions such that their positions always bear a predetermined relationship to one another, said device also controlling means for short circuiting said armature windings while maintaining the supply of electric power to said field windings for dynamically braking said motors to thereby bring said member and said body quickly to rest while maintaining the predetermined relationship.

ERIC CLIFTON WAHLBERG.